Patented Nov. 21, 1950

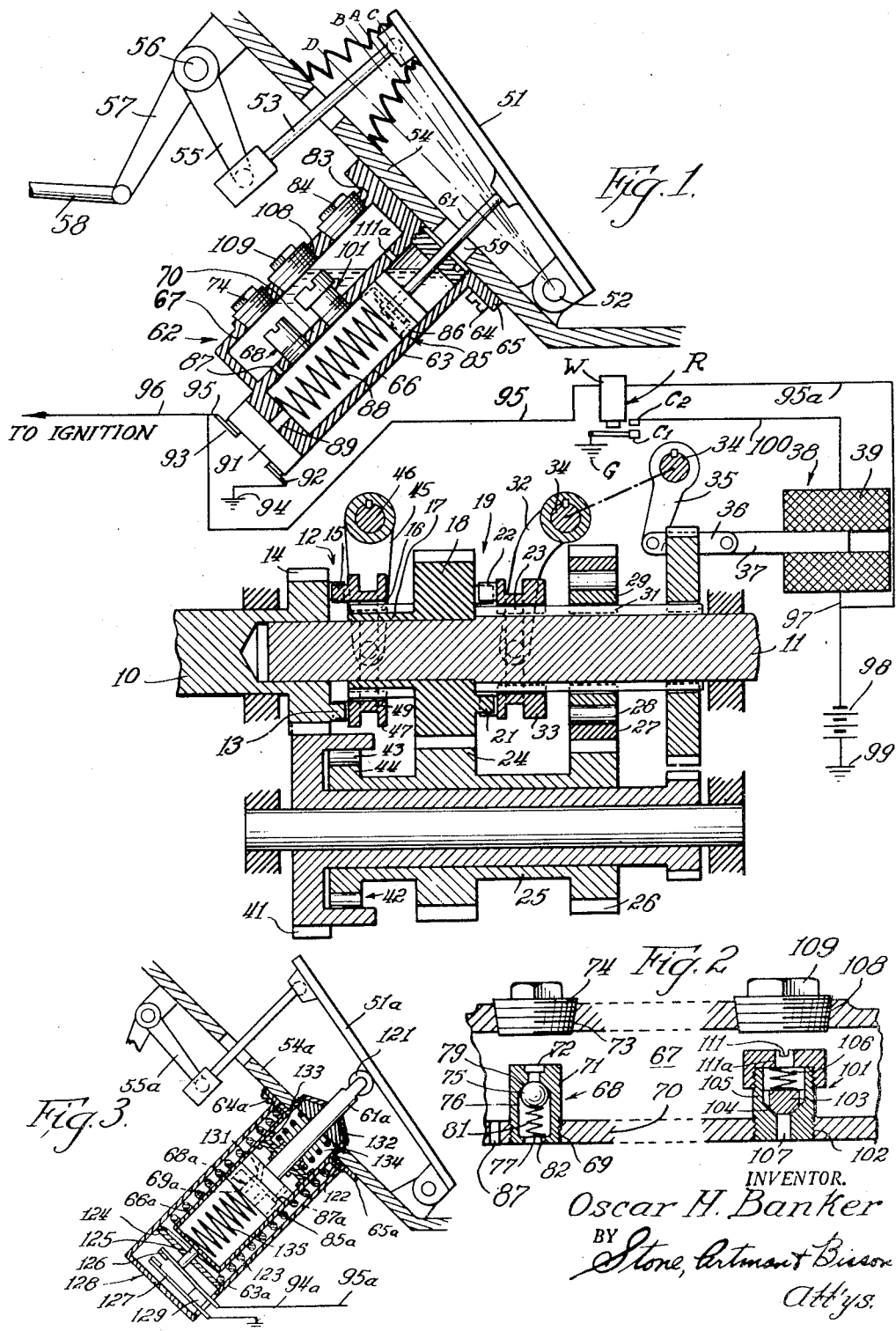

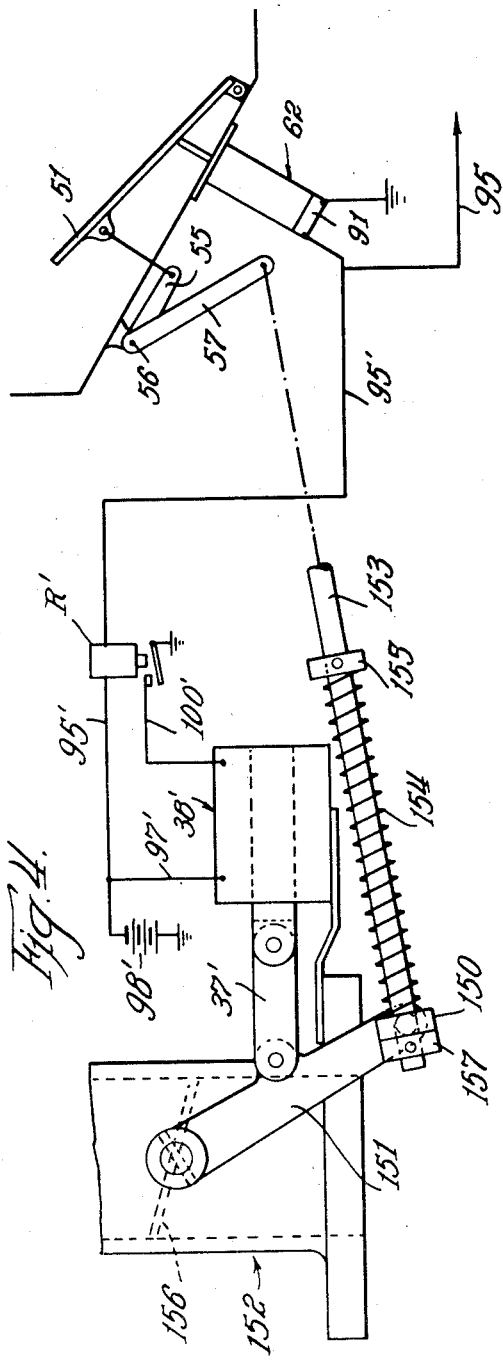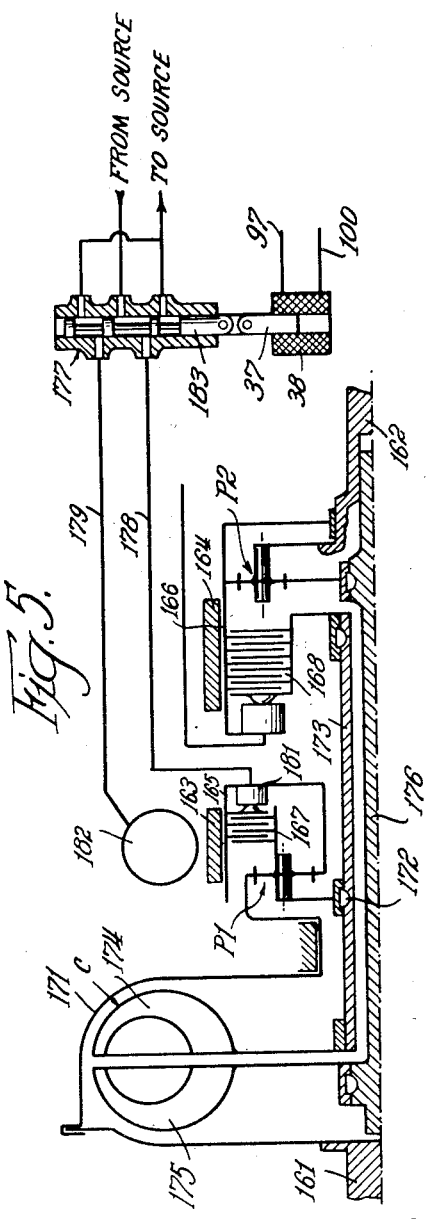

2,530,753

UNITED STATES PATENT OFFICE 2,530,753

CHANGE-SPEED TRANSMISSION CONTROL

Oscar H. Banker, Evanston, Ill., assignor to New Products Corporation, Chicago, Ill., a corporation of Delaware Application October 26, 1944, Serial No. 560,483

17 Claims. (Cl. 74—472)

This invention has to do with a control operable by an engine throttle control member to cause a change in the speed transmitting ratio of a transmission disposed between the engine and a load, and relates more particularly to such a control particularly adapted for use upon engine-driven vehicles to cause a shift into a lower speed connection through the transmission incident to an inordinate advance of the throttle control.

In the change-speed transmissions of recent models of motor cars it has been the practice to employ a cruising speed driving connection which transmits power at greater speed than is compatible with the amount of torque required under some cruising conditions. These transmissions are the so-called "overdrive" type with a fourth speed for cruising and this fourth speed being operable to drive the traction wheels at a greater speed with respect to the engine than the conventional third speed connection. The third speed connection is, in these instances, an overrunning connection so it can remain mobilized, while the fourth speed connection is functioning, in readiness to be established in power transmitting relation immediately upon disestablishment of the fourth speed connection. Hence, while cruising in the fourth speed connection, should it be desirable to employ additional torque as for accelerating to more quickly pass another vehicle, the operator has been able to disestablish the fourth speed connection by disengaging a jaw clutch therein and ipso facto acquiring the third speed connection for meeting the torque-requiring emergency. Heretofore, also, the control for this jaw clutch for disestablishing the fourth speed connection has been operated by the foot accelerator pedal, namely, by a depressing or throttle-advancing movement slightly beyond wide open throttle position for closing an electric circuit containing an electromagnetic device thereby energized to cause opening of said jaw clutch. Because of the throttle being wide open at the time the mechanical means is called upon for opening the jaw clutch, it has been found necessary to employ an auxiliary means for circumventing the otherwise increased pressure between the driving and driven teeth of the jaw clutch so the clutch is susceptible to being opened. This has been accomplished by an engine ignition grounding circuit which is closed and thereby made effective for disrupting operation of the engine concurrently with the closing of the circuit for energizing the clutch-opening electromagnetic device.

Disrupting engine operation by grounding the ignition while the throttle is wide open is undesirable. In the first place it incurs fuel waste at the maximum rate in addition to the jet of extra fuel ejected from the carburetor accelerating well when the accelerator pedal is quickly advanced. Secondly, the rich fuel mixture thus caused to pass through the cylinders into the exhaust is susceptible to explosion with consequent damage to the exhaust muffler and other parts of the exhaust line. These disadvantages have been recognized heretofore. One precautionary measure taken, with the aim of limiting the time the ignition can be grounded though the operator should inadvertently retain the accelerator pedal in its beyond-range position, is the placing of a switch in the ignition grounding circuit and actuated for opening such circuit pursuant to the demobilizing disengaging movement of the fourth speed connection jaw clutch. This cascade of devices, each to supplement a preceding one or counteract an undesirable consequence thereof, has been carried one step further, namely to provide a timing switch device in the ignition grounding circuit, such device being conditioned, pursuant to the movement of the throttle control pedal into the ignition grounding position, to open the grounding circuit after a predetermined time should the operator fail to release the accelerator pedal from the ignition grounding position and the fourth speed jaw clutch fail to open because of sticking or some other unnatural contingency.

An important object of this invention is to provide an improved transmission control for accomplishing the objective of the above mentioned control and operable by movement of a throttle control member but becoming effective in response to an abnormally quick advance of such member without requiring movement as far as the wide open throttle position. This control does not operate to cause a shift to a lower speed when the accelerator member is advanced at normal speed, but is prompt to cause the shift in response to the natural inclination of the operator to quickly press the member under circumstances requiring rapid acceleration.

Another object is the provision of a new throttle-member-operated control which is automatically operable to terminate the ignition disability condition despite inadvertent retention of the throttle member in an advanced position.

Another object is the provision in a transmission control of the present character of fluid body means for transmitting operating force to an electric circuit control switch, and such means permitting dissipation of fluid from the body to allow readjustment of the switch to its unoperated condition.

Another object is the provision in a transmission control of the present character of a device having relatively movable parts of which one is advanceable with the accelerator control member to transmit force through a fluid body, compressible between such parts, for operating the electric circuit control switch, and said device containing a space into which the fluid is displaceable at a rate to prevent said force attaining a magnitude sufficient to operate the switch pursuant to movement of the throttle member at normal speed.

Another object is the provision in an engine-driven transmission control employing an electric switch operable to disable the engine ignition and cause a change in the transmission speed transmitting ratio, of a throttle-member-actuated device including a fluid body disposed in force transmitting relation between the engine throttle member and the switch, and means enabling displacement of part of the fluid to automatically remove the operating force from the switch subsequent to its operation.

In some of the prior art controls, still another speed-responsive device has been employed to prevent energization of the ignition grounding circuit and of the declutching circuit by movement of the accelerator pedal beyond open throttle position while the vehicle is traveling at high speed. This speed-responsive control has been used because the engine could not or should not attain the speed increment necessary for synchronization in establishing the lower speed connection. Still a further object of this invention is the provision of a throttle-member operated device not utilizing a range of movement beyond the open throttle position, and inherently preclude energizing of the ignition-clutch-effecting circuits pursuant to a simple advance of the throttle member while the vehicle is traveling at high speed with the throttle control at or near the open throttle position. If the throttle control member is at the wide-open position it cannot be moved to energize the ignition-clutch-effecting circuits, and if such member is near the wide-open position it cannot be moved far enough to create sufficient pressure on or movement of the fluid body for energizing such circuits.

The invention further contemplates utilization in conjunction with means for diminishing the amount of power transmitted from the engine to the transmission other than ignition-interrupting means. Examples are hereinafter disclosed in the form of an auxiliary electromagnetic throttle closing means. Such power diminishing means may also take the form of an engine brake of the nature illustrated in my U. S. Patent No. 2,335,255.

The invention also extends to the use of a throttle control operable, upon an abnormally quick advance of the throttle control member, to incur change in transmission power trains without concurrent diminution in engine power available to the transmission.

The above and other desirable objects encompassed by and inherent in the invention will be more readily understood upon reading the ensuing description with reference to the annexed single sheet of drawings, wherein:

Fig. 1 is a vertical sectional view taken through the floor of the driver's compartment in an automotive vehicle, showing a preferred embodiment of the invention associated with the accelerator pedal in such compartment and a diagrammatically illustrated change-speed transmission conventionally disclosed beneath the floor board of such compartment;

Fig. 2 is a fragmentary sectional view taken through the casing of the switch actuating device, and enlarged to show the construction of the check valve and of a pressure relief valve;

Fig. 3 is a side elevational view of a second embodiment of the invention with a modified form of hydraulic switch operating device;

Fig. 4 is a partially diagrammatical view illustrating a carburetor control as a means for diminishing the amount of torque transmitted from the engine to the transmission pursuant to an abnormally quick opening of the engine throttle; and Fig. 5 is a partially diagrammatical view of a different type of change-speed transmission which is adapted to shift to a different speed train under control of a hydraulic system and utilizing no diminution of engine torque to expedite the shift.

With continued reference to the drawings, and first to Fig. 1, the change-speed transmission there diagrammatically illustrated corresponds to parts of an automatic change-speed transmission completely disclosed in my copending application, Serial No. 357,388, filed September 19, 1940, now Patent No. 2,449,964 dated September 21, 1948. In illustrating the present invention it will suffice to explain that power is transmitted directly from the drive shaft 10 of this transmission to the driven shaft 11 thereof through a jaw clutch 12 having driving teeth 13 on a gear 14 fixed for rotation with the drive shaft and driven teeth 15 connected by a spline connection 16 to the hub 17 of a gear 18. This direct connecting power train is completed through a second jaw clutch 19 having driving teeth 21 on the gear hub 17 and driven teeth 22 connected by spline connection 23 with the driven shaft 11.

A reduced speed connection is established between the shafts 10 and 11 through a gear train, including the gears 14 and 18, when the clutch 19 is disengaged. This power train includes the clutch 12, splined connection 16 with the gear hub 17, gear 18, countershaft gear 24, countershaft 25, second countershaft gear 26, gear 27, overrunning clutch 28 and the hub 29 of such overrunning clutch which is splined at 31 to the driven shaft 11. It will be understood from this part of the description that while the transmission is connected for operation in the high speed or direct connecting power train between the drive and driven shafts 10 and 11, an instantaneous change can be made to the relatively lower speed power train by disengaging the clutch 19.

Disengagement of the clutch 19 is accomplished by a shifter fork 32 which engages a conventional grooved collar 33 upon the clutch driven element carrying the driven teeth 22. This shifter fork 32 is carried upon a cross shaft 34 and is connected for movement about the cross shaft in unison with an arm 35 (shown in dot-dash lines) disposed exteriorly of the gear casing not shown. The lower end of the arm 35 is connected by a link 36 with an armature 37 of an electromagnet 38 having a winding 39. Disengagement of the clutch 19 is effected by energization of the electromagnet winding 39 which causes the armature 37 to be pulled to the right as viewed in Fig.

1 and to thereby rotate the arm 35 and the shifter fork 32 counter-clockwise about the shaft 34.

During operation of the high speed power train, the driven shaft 11 overruns the gear 27 as permitted by the overrunning clutch 28 and likewise a gear 41 on the countershaft and driven from the gear 14 overruns the countershaft 25 by virtue of an overrunning clutch 42 having clutch rollers 43 and a cam roller actuator hub 44 fixed for rotation with said countershaft.

Jaw clutch 12 is controlled by a shifter fork 45 rotatable about the axis of a cross shaft 46. The lower end of the shifter fork 45 engages a shifter collar 47 upon the driven member 49 of said clutch 12. Additional means not pertinent to the present invention and consequently not shown is employed for manipulating the shifter forks 32 and 45 for controlling the engagement combinations of the clutches 12 and 19.

Only the highest speed train and the next to the highest speed train have been described herein since it is thought that is sufficient for illustrating the utility of the present invention. It will be explained, however, that the transmission gearing is capable of four forward speeds. The lowest of these four speeds is obtained when neither of the clutches 12 and 19 is engaged, the power then being transmitted from the drive shaft through gears 14 and 41, overrunning clutch 42, countershaft 25, gears 26 and 27 and the overrunning clutch 28 to the driven shaft. Second speed is obtained when the clutch 12 is disengaged and the clutch 19 engaged, causing the transmission of power from the drive shaft through gears 14 and 41, overrunning clutch 42, countershaft 25, gears 24 and 18 and the clutch 19 to the driven shaft. Third speed and the fourth speed, the latter being the direct connection of the shafts 10 and 11 for rotation in unison, have already been described. During operation of the first speed, power is transmitted through both of the overrunning clutches 42 and 28. During operation of the second speed, power is transmitted only through the overrunning clutch 42 while the driven shaft overruns the gear 27 at the clutch 28, and, as already explained, during operation of the third speed, power is transmitted through the overrunning clutch 28 while the gear 41 driven from the gear 14 overruns the countershaft 25 at the clutch 42. During operation of the fourth speed the driven shaft overruns the gear 27 by virtue of the clutch 28 and the gear 41 overruns the countershaft by virtue of the clutch 42.

Referring now to the apparatus shown in the upper left-hand portion of Fig. 1, there is shown an accelerator pedal 51 pivoted at 52 to the floor of the driver's compartment. A throttle control rod 53 of conventional construction reaches between a toe portion of the pedal 51 through a hole in the footboard 54 into connection with an arm 55 which when pivoted clockwise with a cross shaft 56 to which it is fixed is operable through a second arm 57 and a linkage, including a link 58, for opening the vehicle engine throttle.

A second hole, 59, is provided in the footboard 54 for receiving a piston rod 61 of a switch actuating device 62 having a casing 63 secured to the underside of the footboard by screws 64 or other suitable fastening devices passing through flange 65 of the casing into said footboard.

Casing 63 includes a cylinder portion 66 and a reservoir portion 67. A check valve 68 establishes one-way communication between the cylinder 66 and the reservoir 67. This check valve is disposed within an opening 69 within a wall 70 of the cylinder. The hole 69 in the cylinder wall 70 is threaded to receive the threaded exterior of the check valve casing 71. A groove 72 is provided in the upper end of the casing 71 for receiving the bit of a screw driver which may be employed for turning the casing 71 into the threaded hole 69. Access to the groove 72 is had through a reservoir wall opening 73 normally closed by a screw plug 74. This hole 73 is also large enough to receive the valve 68 preparatory to its insertion in the opening 69. A check ball 75 in the check valve 68 is movable axially within an enlarged portion 76 of the bore 77 but is normally held in closed association with an annular seat 79 therefor by a light spring 81 reacting downwardly against the peened over portion 82 at the lower end of the casing 71. An oil filling opening 83 for the reservoir is normally closed by a screw plug 84.

A piston 85 connected with the lower end of the piston rod 61 and slidable within the cylinder 66 has its seal with the side walls of the cylinder augmented by a sealing cup 86 which may be of a yieldable material, such as leather or neoprene. A small bleed hole 87 near the lower end of the wall 70 communicates between the cylinder and reservoir. A spring 88 reacts between the lower end of the cylinder and the piston for urging the latter and the piston rod 61 upwardly. In the lower end of the cylinder there is a channel 89 which communicates with the interior of a pressure fluid actuated switch 91 secured to the end of the cylinder. This switch 91 may be of any conventional construction. It contains normally separated switch contacts which are closed when the switch is subjected to a predetermined pressure increment applied through the passage 89. Said normally separated switch contacts are electrically connected with binding posts 92 and 93 of which the first is grounded to the vehicle frame diagrammatically illustrated at 94 and of which the second is connected by an electric conductor 95 with one terminal of a winding W of a relay R for energizing the solenoid 39. A branch conductor 96 electrically connects the binding post 93 with the vehicle engine ignition system in such a manner that when the switch 91 is closed the ground at 94 will be impressed through such switch and the conductor 96 upon the ignition system for grounding the same and making it ineffective, thus interrupting operation of the vehicle engine. Placing of ground upon the conductor 95 completes the relay energizing circuit through the winding W, a conductor 95a and the vehicle battery 98 to ground at 99. When the relay is energized it draws normally open movable contact C1 against fixed contact C2, completing a circuit from ground at G through the contacts C1 and C2, conductor 100, coil 39, conductor 97 and the battery 98 to ground, energizing the electromagnetic device 38.

A pressure relief valve 101 is threaded into an opening 102 in the casing wall 70. This pressure relief valve includes a member 103 normally held against a seat 104 in the valve casing 105 by a spring 106. Upon the creation of a predetermined maximum pressure within the cylinder 66 the relief valve member 103 will be unseated, permitting rapid escape of fluid through the relief valve channel 107 into the reservoir 67. Pressure relief valve 101 is installed through a casing opening 108 normally closed by plug 109, and a groove 111 in the relief valve casing is adapted to receive the bit of a screw driver to facilitate its installation. Communication is had between the upper end of the cylinder 66 and the reservoir 67 through an opening 111a so that any leakage past the piston will be introduced into the reservoir.

While the piston 85 is shown operable directly from the accelerator pedal 51 through the piston rod 61, it should be understood the device 62 may be disposed for actuation of the piston from any part of the accelerator linkage.

Operation of the first form of the invention:

Subsequent to the filling of the reservoir 67 and of the cylinder 66 with a suitable preferably non-compressible fluid, such as oil, the device will be ready for operation.

Assuming the vehicle to be operating with the direct connection of the transmission established as illustrated in Fig. 1, and assuming further that the throttle controlling member (pedal) 51 is depressed to a part throttle opening position A, the operator of the vehicle can effect a virtually instantaneous shift from fourth to third speed by quickly advancing the control member 51 to a position such as B. This sudden movement of the control member 51 from position A to position B will force the piston 85 at such a rate that the liquid trapped within the cylinder beneath the piston cannot escape through the bleed opening 87 into the reservoir 67 sufficiently fast to prevent the development of an adequate pressure of the fluid for actuating the switch 91. An electric circuit will therefore be completed from ground at 94 through the switch 91, conductor 95, the relay winding W and battery 98 to ground at 99, causing energization of the electromagnetic device 38. Concurrently, ground is carried from the thus grounded conductor 95 through the conductor 96 for impression upon the engine ignition circuit, disabling this circuit and causing a disruption of engine operation. Therefore, pressure between the teeth of the jaw clutch 19 is diminished to facilitate the energized solenoid 39 drawing the armature 37 to the right for disengaging said clutch 19. Direct transmission of driving force from the gear hub 17 to the driven shaft 11 is thereby terminated and the third speed drive becomes effective through gears 18 and 24, countershaft 25, gears 26 and 27 and the overrunning clutch 28 to the driven shaft 11.

Upon quickly advancing the accelerator pedal, say from the position A to the position B, in effecting the shift from fourth speed to third speed, should the operator immediately release the accelerator pedal 51 a short distance, the spring 88 would force the piston 85 upwardly, reducing the pressure in the cylinder 66 and causing the switch 91 to open to take the ground from the engine ignition so the engine will again function. But irrespective of whether the operator allows the accelerator pedal 51 to retract, there will be ample leakage through the bleed opening 87 to quickly relieve the pressure of the compressed fluid in the cylinder 66 for causing the switch 91 to open.

It will be noted that since the accelerator pedal 51 merely abuts the upper end of the piston rod 61 subsequent to depression of the accelerator pedal, this pedal may be released at the normal speed which may be faster than the spring 88 will return the piston 85 and the piston rod 61. Return of the piston upwardly by the force of spring 88 incurs unseating of the ball 75 in the check valve 68 so that during the return movement of the piston, oil from the reservoir will enter the cylinder 66 through the valve 68 as well as through the bleed opening 87. These two communications between the reservoir 67 and the cylinder 66 enable the piston to return sufficiently fast to maintain or at least nearly maintain contact between the upper end of the rod 61 and the pedal 51.

Should the operator of the vehicle desire to quickly advance the accelerator pedal 51 through a large range so as to obtain greater engine power, this movement of the pedal will not be trammeled by the hydraulic device 62 because of the pressure relief valve 101 which limits the pressure attainable within the cylinder 66 and thereby limits the resistance the piston 85 can offer to advancing movement of the pedal 51. However, the pressure at which the pressure relief valve 101 opens for permitting escape of fluid from the cylinder into the reservoir is higher than that necessary for closing the switch 91. During normal operation of the vehicle, the pedal 51 will be advanced and retracted between the closed throttle position C and the wide-open throttle position D at normal speeds for which the bleed opening 87 will have sufficient capacity for enabling escape of fluid from the cylinder 66 into the reservoir 67 sufficiently rapidly to prevent the pressure fluid in the cylinder 66 being built up to a point for closing the switch 91. It is only when the operator advances the pedal 51 at an inordinate speed that sufficient pressure will be developed for closing the switch 91.

In that form of switch closing device illustrated in connection with the second embodiment shown in Fig. 3, the operating characteristics are intended to be like those explained in connection with the first form of the invention. In Fig. 3 those parts identical or corresponding to parts in the first embodiment are designated by the same respective reference characters with the suffix "a." Piston rod 61a in this instance is provided with a roller 121 on its upper end for bearing against the underside of the pedal 51a. A casing 63a has a flange 65a secured to the underside of the footboard 54a by screw devices 64a. Within the casing there is a cylindrical cup 66a having an out-turned flange 122 at its upper end which is reacted upon by a compression spring 123 of which the lower end reacts against a circular bottom 124 in the lower end of the casing. Thus, the spring 123 normally retains the cylinder in the uppermost position illustrated in the drawing. At the lower end of the axially movable cylinder 66a there is an extension 125 projectable downwardly with such cylinder against a spring contact member 126 for closing it against a second contact member 127. These contact members of a switch 128 are normally out of contact and are insulated from one another by a holding means 129 therefor suitably supported within the casing 63a.

A check valve 68a is disposed within a channel 69a formed in the piston 85a and having a branch 131 communicating with the cylinder on the upper side of the piston. Also communicating axially through the piston is a bleed opening 87a. A suitable sealing ring 132 is provided between the piston rod 61a and the upper end of the casing 63a. A second sealing ring, 133, is disposed between the piston rod and the cylinder where it is urged into spaced relation from the ring 132 by a helical compression spring 134.

The effect of closing the switch 128 is the same as that when the switch 91 is closed as explained in connection with the first embodiment. In the operation of this second embodiment, advancing movement of the pedal 51a in a normal manner will cause depression of the piston rod 61a and of the piston 85a at such a speed that oil trapped within the lower end of the cylinder 66a can escape upwardly through the breather opening 87a at a rate to preclude the attainment of a sufficiently high pressure of the fluid beneath the piston for forcing the cylinder 66a downwardly against the force of the spring 123. Consequently, the switch closing boss 125 will not be moved for closing the switch 128. During this downward movement of the piston 85a, it compresses a spring 135 against the bottom of the cylinder, this spring having less expansive force than the spring 123. Subsequent to release of the accelerator pedal this spring 135 forces the piston 85a upwardly, causing a reversal of flow of the fluid from that part of the cylinder above the piston to that part below it, part of the reversed flow fluid passing downwardly through the breather opening 77a, and part of it through the channel portion 131 and the check valve 68a. This combined flow capacity of the openings or channels 87a and 131 enables the spring 135 to return the piston with sufficient speed to at least nearly keep the roller 121 in contact with the pedal 51a.

Should the operator wish to close the switch 128 for causing a shift in the transmission power trains, he accomplishes this act by a short rapid advance of the accelerator pedal whereby the fluid in that portion of the cylinder beneath the piston cannot escape through the breather opening 87a rapidly enough to overcome transmission of sufficient force through the fluid body for moving the cylinder and the boss 125 downwardly into the switch closing position. Immediately thereafter the switch will be opened. Should the operator allow the accelerator pedal 51a to retract, such opening of the switch 128 will occur because of the spring 123 then being operable to retract the cylinder 66a. On the other hand, should the operator retain the accelerator pedal in the advanced position, the breather opening 87a will very quickly permit the escape of enough fluid from that body of fluid, trapped between the piston and the bottom of the cylinder, to permit the spring 123 to move the cylinder and the switch closing boss 125 upwardly to permit reopening of the switch.

In Fig. 4 a modified form of engine torque reduction control is shown for use in lieu of the ignition grounding circuit including the conductor 96 in Fig. 1. The throttle linkage arm 57 is connected with a throttle operating lever 151 of the engine carburetor 152 by a rod 153 and a compressible helical spring 154. This spring reacts between a collar 150 slidably on the rod and a collar 155 fixed to the rod and is sufficiently strong to swing the arm 151 (which is pivotally connected with collar 150) clockwise for opening the throttle valve 156 when the pedal 51 is depressed in normal fashion. A second collar, 157, prevents the spring 154 from sliding the collar 150 from the end of the rod. Incident to the abnormal advancement of the pedal 51, the switch 91, for example, will be closed and be thus effective through the conductor 95 to energize the relay W of Fig. 1 and the solenoid device 38 for urging separation of the toothed components of the clutch 19. Concurrently a conductor 95' energizes a circuit containing a relay R' and a battery 98'. When the relay is energized it grounds conductor 100' and thus energizes the electromagnet 38' by connecting it in series with the battery 98'. Thus the electromagnetic device is energized to pull upon the link 37' and momentarily swing the throttle arm 151 to closed-throttle position while compressing the spring 154. This diminishes the amount of torque transmitted from the engine through the clutch 19 to facilitate opening thereof by the device 38.

The transmission of Fig. 5 has a drive shaft 161 which drives a coaxial driven shaft 162 through a fluid coupling C and a pair of planetary gear units P1 and P2. This disclosure in Fig. 5 is a diagrammatic illustration of the current model of the Oldsmobile "Hydramatic" transmission. A detailed illustration of this particular transmission appears on pages 468 and 469 of the November 1939, issue of Product Engineering magazine. Fourth speed direct drive is established through the transmission when the brake bands 163 and 164 are released respectively from the sun gear brake drum 165 of unit P1 and from the ring gear brake drum 166 of the unit P2, and when the two planetary units are locked up for unitary rotation of their elements by the engagement of their disc clutches 167 and 168. Clutch 167 locks the sun gear of unit P1 to its carrier whereas the clutch 168 and the fluid coupling (neglecting slippage of such coupling) virtually lock up the unit P2. Power is transmitted from the drive shaft 161 through the coupling casing 171 to the locked-up unit P1. The power divides at the point 172 of attachment of the carrier to a sleeve shaft 173, part of the power being transmitted to the left end of this shaft to the coupling impeller 174 and thence to the runner 175 and intermediate shaft 176 to the sun gear of unit P2. The remainder of the power applied to the sleeve shaft 173 from the carrier of P1 is transmitted to the right end of this shaft and thence through the clutch 168 to the ring gear of P2. These two paths of power applied to the planet gears of the unit P2 differentially drive the carrier of the unit in the same direction and virtually at the same speed as the drive shaft 161. Since the driven shaft 162 is directly connected to the carrier of P2 this driven shaft is similarly driven.

Third speed is attained when the brake band 164 remains disengaged and when the clutch 168 remains engaged while the brake band 163 is engaged with the brake drum 165 and the clutch 167 is disengaged. When this status is incurred the power is transmitted to the driven shaft 162 in the divided manner from the connecting point 172 of the P1 carrier with the sleeve shaft 173, but this carrier is then driven at a reduced speed instead of at the speed of the drive shaft.

A valve 177, auxiliary to the standard hydraulic system, is interposed in the fluid pressure lines 178 and 179 through which fluid is delivered to and exhausted from motors 181 and 182 which respectively engage the clutch 167 and apply the brake band 163 when subjected to pressure from a source not shown.

The plunger 183 of the valve is normally in the position shown wherein it is effective for establishing communication between the high pressure side of the source and the conduit 178 while establishing communication between the conduit 179 and the low pressure side of the source when of course the regular components of the fluid control system are adjusted for incurring engagement of the clutch 167 and release of the brake band 163. By pulling the plunger 183 downwardly the connections of the conduits 178 and 179 with the high and low pressure portions of the source can be instantaneously reversed whereby the clutch 167 will be released and the brake band 163 applied. In this manner the transmission can be instantaneously shifted from fourth speed to third speed. This shift from fourth to third speed can be brought about under control of the accelerator pedal and associated control apparatus as that illustrated in Fig. 1. In Fig. 5 the electromagnetic device 38 and its armature 37 are shown operatively connected with the valve plunger 183 for pulling this plunger downwardly and shifting from fourth speed to third speed in the aforesaid manner pursuant to an inordinate advance of the accelerator pedal.

Having thus described these preferred forms, I claim:

1. In combination, a vehicle comprising a throttle-controlled engine, a throttle control member for said engine, road wheels, a change-speed transmission in power transmitting relation between said engine and said road wheels and adjustable from one speed transmitting condition to a lower speed transmitting condition upon the actuation of an adjusting means therefor, electric circuit means conditionable with respect to its electric current carrying condition for causing actuation of the transmission adjusting means and including switch means operable to so condition the same, and a switch operating structure adapted to transmit an operating force from the throttle control member to said switch means, said switch operating structure including a fluid body through which such force is imposable from the throttle control member to the switch means for operating the latter when the throttle control member is advanced abnormally quickly and said structure also including escape means through which the fluid can escape to incur volumetric decrease of the body and thus avert imposing enough force therethrough for operating the switch means when the throttle control member is advanced more slowly.

2. In a vehicle, propelling means, an ignition type throttle-controlled engine, a change-speed transmission employed between said engine and said propelling means and adjustable from one speed transmitting condition to a lower speed transmitting condition upon the actuation of an adjusting means therefor, a throttle control member for said engine, electric circuit means conditionable with respect to its electric current carrying condition for causing actuation of the transmission adjusting means and concurrently interrupting the engine ignition, said electric circuit means including switch means operable to so condition the same, a thrust structure disposed between the throttle control member and said switch means, said thrust structure including a fluid body through which thrust is imposable from the throttle control member to the switch means for operating the latter when the throttle control member is advanced abnormally quickly and including escape means through which the fluid can escape sufficiently rapidly to avert the imposing of enough thrust for operating the switch means when the throttle control member is advanced more slowly.

3. In a vehicle, propelling means, an ignition type throttle-controlled engine, a change-speed transmission employed between said engine and said propelling means and adjustable from one speed transmitting condition to a lower speed transmitting condition upon the actuation of an adjusting means therefor, a throttle control member for the throttle of said engine, electric circuit means conditionable with respect to its electric current carrying condition for causing actuation of the transmission adjusting means and interruption of the engine ignition and including switch means operable to so condition the same, and a switch operating structure adapted to transmit an operating force from the throttle control member to said switch means, said switch operating structure including a fluid body through which such force is imposable from the throttle control member to the switch means for operating the latter when the throttle control member is advanced abnormally quickly, escape means through which such fluid car escape to avert imposing enough force therethrough for operating the switch means while the throttle control member remains advanced subsequent to the quick advance thereof, and means for urging the fluid through said escape means following said advancement of the throttle control member so the ignition will be restored despite prolonged retention of said control member advanced.

4. In a vehicle, propelling means, an ignition type throttle-controlled engine, a change-speed transmission employed between said engine and said propelling means and adjustable from one speed transmitting condition to a lower speed transmitting condition upon the actuation of an adjusting means therefor, a throttle control member for the throttle of said engine, electric circuit means conditionable with respect to its electric current carrying condition for causing actuation of the transmission adjusting means and interruption of the engine ignition and including switch means operable to so condition the same, and a switch operating structure adapted to transmit an operating force from the throttle control member to said switch means, said switch operating structure including a fluid body through which such force is imposable from the throttle control member to the switch means for operating the latter when the throttle control member is advanced abnormally quickly, escape means through which the fluid can escape to incur volumetric decrease of the body and thus avert imposing enough force therethrough for operating the switch means when the throttle member is advanced more slowly, and means for urging the fluid through said escape means following a rapid advancement of the throttle control member so the ignition will be restored despite prolonged retention of said control member advanced.

5. In a vehicle, propelling means, an ignition type throttle-controlled engine, a change-speed transmission employed between said engine and said propelling means and adjustable from one speed transmitting condition to another speed transmitting condition upon the actuation of an adjusting means therefor, a throttle control member for the throttle of said engine, electric circuit means conditionable with respect to its electric current carrying condition for causing actuation of the transmission adjusting means and including switch means operable to so condition the same, resilient means yieldable resisting operation of the switch means, a switch operating structure adapted to transmit an operating force from the throttle control member to said switch means, said switch operating structure including a fluid body through which such force is imposable from the throttle control member to the switch means for operating the latter when the throttle control member is advanced abnormally quickly, said structure also including escape means through which the fluid can escape to avoid sufficient pressure in said body for overcoming said resilient means when the throttle control member is advanced more slowly, and said resilient means being operable to restore the unoperated condition of said switch subsequent to an abnormally quick and prolonged advance of the throttle control member incident to displacing fluid from said body through the escape means.

6. In a control for a change-speed transmission employed between a vehicle engine and the vehicle propelling means and wherein the transmission is adjustable from one speed transmitting capability to a lower speed transmitting capability; the combination of an engine control member mounted on the vehicle for movement within a control range to control the power output of the engine in accordance with such movement, transmission controlling means operable responsively to an operating force applied thereto to incur the aforesaid adjustment of the transmission, and a pressure-producing device employing fluid pressure for applying said operating force to the transmission controlling means pursuant to development of a minimum pressure of fluid in such device, said device comprising an expansible and contractible fluid-receiving chamber mounted upon the vehicle, said chamber including a wall which is movable relatively to other walls thereof to effect the chamber contraction and consequent increase of the pressure of fluid therein, means disposed between said movable wall and the engine control member to cause contraction of the chamber and an increase of fluid presure therein to attain said minimum pressure for applying said operating force to the transmission-controlling means pursuant to an abnormally quick advance of said control member within its range of engine control movement, and said device also including escape means through which the fluid can escape from said chamber sufficiently rapidly to preclude attainment of said minimum pressure when the engine control member is advanced more slowly.

7. In a control for a change-speed transmission employed between a vehicle propelling means and a vehicle engine having its power output increased and decreased by respective advancement and retraction of an engine output control member within a range of controlling movement; the combination of means actuatable to diminish the power transmitted from the engine to said transmission and to concurrently incur adjustment of the transmission from one speed transmitting capability to a lower speed transmitting capability, said actuatable means being effective to incur diminution in such transmission of power only while actuated and capable of reestablishing the non-actuated condition to avoid such power transmission diminution when relieved of actuation subjection, and a pressure-producing device employing fluid pressure for subjecting the actuating means to actuation pursuant to development of a minimum fluid pressure in the device, said device comprising an expansible and contractible fluid-receiving chamber having a wall component movable to effect chamber contraction and expansion and consequent increase of fluid pressure therein incident to the contraction, a force transmitter interposed between said movable chamber wall component and the engine power output control member to move said wall component for compressing the fluid incident to advancement of the control member within its said range while accommodating retraction of the control member independently of said chamber wall component, a fluid by-pass through which fluid can escape from said chamber to preclude attainment of sufficient fluid pressure in the chamber to subject the actuation means to actuation excepting when the engine power output member is advanced inordinately quickly, and said by-pass serving the further function of providing for escape of fluid from the chamber upon the termination of the inordinately quick advance of said member, to diminish the fluid pressure and thus cause the device to impose but a transient actuation of the actuating means irrespective of the time period the control member is held advanced.

8. In a control for a change-speed transmission employed between a vehicle engine and the vehicle propelling means, and wherein the transmission is adjustable from one speed transmitting capability to a lower speed transmitting capability; the combination of an engine control member mounted on the vehicle for movement within a control range to increase the engine power output when said member is advanced and to decrease the engine power output when said member is retracted, transmission controlling means operable responsively to an operating force applied thereto to incur adjustment of the transmission into the lower speed transmitting capability, and a pressure-producing device employing fluid pressure for applying said operating force to the transmission controlling means pursuant to the production of a minimum fluid pressure in the device, said device comprising a chamber for containing and compressing the fluid when a wall component of such chamber is advanced inwardly of the chamber, means for advancing said chamber wall component with the engine output control member, by-pass means through which fluid can escape from the chamber sufficiently rapidly to preclude attainment of said minimum pressure excepting when the control member is advanced inordinately quickly, and pressure relief valve means operable to augment the escape rate of fluid from the chamber when the pressure therein exceeds said minimum, so the device will avoid trammelling extraordinarily quick advance of the engine output control member.

9. In a control for a change-speed transmission employed between the propelling means of a vehicle and an engine thereof having its power controlled in accordance with movement of a control member and which transmission is adjustable from one speed transmitting condition to another speed transmitting condition; the combination of an adjusting means actuatable to adjust the transmission, and means including a member movable by said control member and operable responsively solely to an abnormally quick movement of such control member in a direction increasing power output of the engine to actuate said adjusting means.

10. In combination, a vehicle comprising propelling means, an engine, an engine control member movable to control the power developed by said engine, a change-speed transmission employed between said engine and said propelling means and including an adjusting means operable to adjust such transmission from one speed transmitting capability to another, and a control for said transmission including electric circuit means conditionable with respect to its electric current carrying condition for causing operation of the transmission adjusting means, a circuit conditioner device operable for so conditioning the electric circuit pursuant to an abnormally quick movement of a part of such device, and means interposed between the engine control member and said part for moving the same abnormally quickly by an abnormally quick power increasing movement of said member within the range of its movement which controls the engine power.

11. In a control for a change-speed transmission employed between the propelling means of a vehicle and an ignition type engine having its power controlled in accordance with movement of a control member within a power controlling range, and wherein the transmission is adjustable from one speed transmitting condition to another; the combination of an adjusting means controllable to adjust the transmission, ignition interrupting means controllable to disrupt power output of the engine, means operable responsively to an abnormally quick movement of a part thereof to concurrently control said transmission adjusting means and said ignition interrupting means to cause disruption of the ignition and adjustment of the transmission, and means interposed between said engine power control member and said part of the last named means to effect such abnormally quick movement of such part responsively to an abnormally quick power increasing movement of the power control member.

12. In a control for a change-speed transmission employed between a drivable load and an ignition type engine having its power controlled in accordance with movement of a control member within a power controlling range, and wherein the transmission is adjustable from one speed transmitting condition to a slower speed transmitting condition; the combination of an adjusting means controllable to so adjust the transmission, controllable ignition interrupting means operable, only while so controlled, to diminish power output of the engine, means operable responsively to an abnormally quick movement of a part thereof to concurrently transiently control said transmission adjusting means and said ignition interrupting means as aforesaid, and means interposed between the engine power control member and said part for acceleratively moving said part at a rate responsively correlated with the rate of accelerated movement of such control member within said range in a direction increasing the engine power output.

13. In combination, a vehicle comprising propelling means, an ignition type engine, an engine control member movable within a power controlling range to control the power developed by said engine, a change-speed transmission employed between said engine and said propelling means and including an adjustable means operable to adjust each transmission from one speed transmitting condition to another, an electric circuit means conditionable, with respect to its electric current carrying capabilities, for causing operation of the transmission adjusting means and concurrently interrupting the engine ignition, a circuit conditioner device operable for conditioning the electric circuit as aforesaid pursuant to an abnormally quick movement of a part thereof, and means interposed between the engine power control member and said part to cause movement thereof at a speed correlated with the speed of movement of said control member within its power controlling range.

14. In a control for a change-speed transmission employed between the propelling means of a vehicle and an ignition type engine having its power controlled in accordance with movement of a control member within a power controlling range, and wherein the transmission is adjustable from one speed transmitting condition to another; the combination of an adjusting means controllable to so adjust the transmission, ignition interrupting means energizable to interrupt the engine ignition, only while energized, and thereby diminish power output of the engine, electric circuit means conditionable, with respect to its current carrying capabilities, to control the transmission adjusting means as aforesaid and to concurrently energize said ignition interrupting means only while so conditioned, a circuit conditioner device operable responsively to abnormally quick movement of a part thereof to transiently condition said circuit means, and means interposed between said control member and said device part to abnormally quickly move the same pursuant to an abnormally quick engine power increasing movement of said control member within said range.

15. In a control for a change-speed transmission employed between an engine and a load to be driven thereby and having its power output controlled in accordance with movement of a control member within a power controlling range, and wherein the transmission is adjustable from one speed transmitting capability to another; the combination of an adjusting means actuatable to adjust the transmission, means actuatable to diminish the power transmitted from the engine to the transmission, means operable responsively solely to an abnormally quick movement of a part thereof to incur concurrent actuation of both of said means, and means interposed between said part and said control member for moving said part at a rate correlated with the rate of movement of the control member within said range and in the direction to increase engine power output.

16. In a control for a change-speed transmission employed between an engine and a load to be driven thereby and having its power output controlled in accordance with movement of a control member within a power controlling range, and wherein the transmission is adjustable from one speed transmitting capability to another; the combination of an adjusting means actuatable to adjust the transmission, means actuatable to incur a transient diminution in the power transmitted from the engine to said transmission, means operable responsively solely to an abnormally quick movement of a part thereof to incur concurrent actuation of both of said means, and means interposed between said part and said control member for moving said part at a rate correlated with the rate of movement of the control member within said range and in the direction to increase engine power output.

17. In a control for a change-speed transmission employed between an engine and a load to be driven thereby and having its power output controlled in accordance with movement of a control member within a power controlling range, and wherein the transmission is adjustable from one speed transmitting capability to another; the combination of an adjusting means actuatable to adjust the transmission, means actuatable to diminish the power transmitted from the engine to the transmission while actuated and capable of re-establishing a non-actuated condition to avoid such power diminution when relieved of actuation subjection, means operable responsively to abnormally quick movement of a part thereof to concurrently transiently actuate said transmission adjusting means and said power diminishing means, and means interposed between said part and said power output control member to impart such abnormally quick movement to said part pursuant solely to an abnormally quick power increasing movement of the engine power control member within said range.

OSCAR H. BANKER.

REFERENCES CITED

The following references are of record in the file of this patent:

UNITED STATES PATENTS

| Number | Name | Date |
|---|---|---|
| 2,242,519 | Frank | May 20, 1941 |
| 2,255,020 | Barnes | Sept. 2, 1941 |
| 2,257,674 | Dunn | Sept. 30, 1941 |
| 2,326,808 | Van Tuyl et al. | Aug. 17, 1943 |
| 2,354,596 | Jandasek | July 25, 1944 |

FOREIGN PATENTS

| Number | Country | Date |
|---|---|---|
| 387,941 | Great Britain | Feb. 16, 1933 |